(12) United States Patent
Alidina et al.

(10) Patent No.: US 6,530,014 B2
(45) Date of Patent: *Mar. 4, 2003

(54) NEAR-ORTHOGONAL DUAL-MAC INSTRUCTION SET ARCHITECTURE WITH MINIMAL ENCODING BITS

(75) Inventors: Mazhar M. Alidina, Allentown, PA (US); Mark E. Thierbach, South Whitehall Township, PA (US); Sivanand Simanapalli, Santa Clara, CA (US); Larry R. Tate, South Barrington, IL (US)

(73) Assignee: Agere Systems Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,882

(22) Filed: Aug. 12, 1998

(65) Prior Publication Data

US 2002/0099923 A1 Jul. 25, 2002

Related U.S. Application Data

(60) Provisional application No. 60/058,157, filed on Sep. 8, 1997.

(51) Int. Cl.[7] .............................................. G06F 9/302
(52) U.S. Cl. ....................................................... 712/221
(58) Field of Search .............................. 712/2, 10, 220, 712/221

(56) References Cited

U.S. PATENT DOCUMENTS 5,560,039 A    9/1996  Dulong ........................ 395/800
6,055,619 A  * 4/2000  North et al. .................... 712/36

FOREIGN PATENT DOCUMENTS

EP           0 681 236 A1   11/1995   ........... G06F/9/302

* cited by examiner

Primary Examiner—David Y. Eng
(74) Attorney, Agent, or Firm—Ryan, Mason & Lewis, LLP

(57) ABSTRACT

A near-orthogonal dual-MAC instruction set is provided which implements virtually the entire functionality of the orthogonal instruction set of 272 commands using only 65 commands. The reduced instruction set is achieved by eliminating instructions based on symmetry with respect to the result of the commands and by imposing simple restrictions related to items such as the order of data presentation by the programmer. Specific selections of commands are also determined by the double word aligned memory architecture which is associated with the dual-MAC architecture. The reduced instruction set architecture preserves the functionality and inherent parallelism of the command set and requires fewer command bits to implement than the full orthogonal set.

14 Claims, 3 Drawing Sheets

FIG. 2

ORTHOGONAL DUAL-MAC INSTRUCTION SET

| ACCUMULATE STATEMENTS | PRODUCT STATEMENTS | REMARKS |
|---|---|---|
| TWO-INPUT STATEMENTS<br>aD = aS+p0<br>aD = aS−p0<br>aD = aS+p1<br>aD = aS−p1<br><br>THREE-INPUT STATEMENTS<br>aD = aS+p0+p1<br>aD = aS+p0−p1<br>aD = aS−p0+p1<br>aD = aS−p0−p1<br><br>DUAL TWO-INPUT STATEMENTS<br>aD0 = aS0+p0   aD1 = aS1+p1<br>aD0 = aS0+p0   aD1 = aS1−p1<br>aD0 = aS0−p0   aD1 = aS1+p1<br>aD0 = aS0−p0   aD1 = aS1−p1 | SINGLE-PRODUCT<br>p0 = xh*yh<br>p0 = xh*yl<br>p0 = xl*yh<br>p0 = xl*yl<br>p1 = xh*yh<br>p1 = xh*yl<br>p1 = xl*yh<br>p1 = xl*yl<br><br>TWO-PRODUCT<br>p0 = xh*yh   p1 = xh*yl<br>p0 = xh*yh   p1 = xl*yh<br>p0 = xh*yh   p1 = xl*yl<br>p0 = xh*yl   p1 = xh*yh<br>p0 = xh*yl   p1 = xl*yh<br>p0 = xh*yl   p1 = xl*yl<br>p0 = xl*yh   p1 = xh*yh<br>p0 = xl*yh   p1 = xh*yl<br>p0 = xl*yh   p1 = xl*yl<br>p0 = xl*yl   p1 = xh*yh<br>p0 = xl*yl   p1 = xh*yl<br>p0 = xl*yl   p1 = xl*yh | 4 DIFFERENT SINGLE 2-INPUT ACCUMULATE STATEMENTS; 4 DIFFERENT SINGLE 3-INPUT ACCUMULATE STATEMENTS; 4 DIFFERENT DUAL 2-INPUT ACCUMULATE STATEMENTS<br><br>TOTAL = 12 ACCUMULATE COMBINATIONS<br><br>8 DIFFERENT SINGLE PRODUCT STATEMENTS;<br>12 DIFFERENT TWO PRODUCTS STATEMENTS<br><br>TOTAL = 20 PRODUCT COMBINATIONS<br><br>TOTAL NUMBER OF POSSIBLE COMMANDS:<br>12 × 20 + 12 + 20 = 272 COMBINATIONS |

FIG. 3

NEAR-ORTHOGONAL DUAL-MAC INSTRUCTION SET

| ACCUMULATE STATEMENTS | PRODUCT STATEMENTS | REMARKS |
|---|---|---|
| TWO-INPUT STATEMENTS<br>aD = aS+p0<br>aD = aS−p0<br><br>THREE-INPUT STATEMENTS<br>aD = aS+p0+p1<br>aD = aS+p0−p1<br>aD = aS−p0+p1<br>aD = aS−p0−p1<br><br>DUAL TWO-INPUT STATEMENTS<br>aD = aS+p0    aDP = aSP+p1<br>aD = aS+p0    aDP = aSP−p1<br>aD = aS−p0    aDP = aSP+p1<br>aD = aS−p0    aDP = aSP−p1 | SINGLE-PRODUCT<br>p0 = xh*yh<br><br>TWO-PRODUCT<br>p0 = xh*yh   p1 = xh*yl<br>p0 = xh*yh   p1 = xl*yl<br>p0 = xh*yl   p1 = xl*yh<br>p0 = xl*yh   p1 = xl*yl | 2 DIFFERENT SINGLE 2-INPUT ACCUMULATE STATEMENTS; 4 DIFFERENT SINGLE 3-INPUT ACCUMULATE STATEMENTS; 4 DIFFERENT DUAL 2-INPUT ACCUMULATE STATEMENTS<br><br>TOTAL = 10 ACCUMULATE COMBINATIONS<br><br>1 SINGLE PRODUCT STATEMENTS;<br>4 DIFFERENT TWO PRODUCTS STATEMENTS<br><br>TOTAL = 5 PRODUCT COMBINATIONS<br><br>TOTAL NUMBER OF POSSIBLE COMMANDS:<br>10 x 5 + 10 + 5 = 65 COMBINATIONS |

NEAR-ORTHOGONAL DUAL-MAC INSTRUCTION SET ARCHITECTURE WITH MINIMAL ENCODING BITS

CROSS REFERENCE TO RELATED APPLICATIONS

This application claims priority under 35 U.S.C. §119 from U.S. Provisional Application Ser. No. 60/058,157 entitled "NEAR-ORTHOGONAL DUAL-MAC INSTRUCTION SET WITH MINIMAL ENCODING BITS," filed on Sep. 8, 1997, the contents of which is hereby incorporated by reference.

FIELD OF THE INVENTION

This invention relates to the instruction set architecture of a dual multiply-accumulator (MAC) based digital signal processor.

BACKGROUND OF THE INVENTION

A digital signal processor (DSP) is a special-purpose CPU utilized for digital processing and analysis of signals from analogue sources, such as sound. The analog signals are converted into digital data and analyzed using various algorithms, such as Fast Fourier Transforms. DSPs are designed for particularly fast performance of certain operations, such as multiplication, multiplying the accumulating, and shifting and accumulating, because the math-intensive processing applications for DSPs rely heavily on such operations. For this reason, a DSP will typically include special hardware circuits to perform multiplication, accumulation and shifting operations.

One popular form of DSP architecture is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature. In order to increase the processing power of MAC processors, they have been designed to perform different processes concurrently. Towards this end, DSP architectures with plural MAC structures have been developed. For example, a dual MAC processor is capable of performing two independent MAC operations concurrently.

A conventional multiply-accumulator (MAC) has a 2-input multiplier M which stores its output in a product register P. The product register is connected to one input of a two-input adder A whose output is stored in one of several accumulator registers. A second input of the adder is connected to the accumulator array to allow for a continuous series of cumulative operations. Conventional vector processors are made of several MAC processors operating in parallel. Each MAC operates on its own independent data stream and the parallel MACs are joined only by a common set of accumulators. The number of instructions available for each individual MAC is fairly limited and thus, even when several MACs are combined in a parallel vector processor, the total number of MAC commands which must be encoded is relatively small.

The architecture of the newly designed dual-MAC processor shown in FIG. 1 differs from conventional parallel vector processors by the addition of the cross-connecting data lines. The dual-MAC architecture of FIG. 1 consists of two 32-bit input x and y (the 16-bit high and low data halves will be referred to as xh and yh, and xl and yl, respectively) which hold the operands to the two multipliers M0 and M1. The x and y registers are cross-connected to both of the multipliers so that each multiplier can operate on any two of the four possible input factors. The products p0 and p1 are accumulated with the contents of any of the accumulators a0 to a7 by the two adders A0 and A1. The p0 product is also cross-connected to the A1 adder, which is capable of 3-input addition. In the preferred embodiment, the dual-MAC processor is implemented in conjunction with an aligned double word memory architecture which can return two double words in a single 32-bit fetch.

This cross-connected dual-MAC architecture allows a single FIR or IIR digital filter applied to a single data stream to be processed by both MACs in parallel, two taps at a time, where each "tap" is a multiply-accumulate operation. Conventional vector processors with no interconnects can compute two FIR filters in parallel, but each filter is processed one tap at a time. Thus, for a single FIR or IIR filter, the cross-connected architecture operates twice as quickly as a conventional vector processor.

FIG. 2 is a list of all the possible instruction commands for the cross-connected dual-MAC architecture of FIG. 1. The commands are divided into accumulate statements and product statements. Each statement represents either a single operation done on one MAC side or the other, or two operations done on both sides in parallel. When these commands are implemented as part of architected instructions, each will either be an accumulate statement (add), a product statement (multiply), or a combination of addition and multiplication.

As shown in FIG. 2, there are 12 possible accumulate combinations and 20 possible product combinations in the orthogonal dual-MAC instruction set. Thus, the total number of commands which can be architected in the command processor and encoded within the commands is 12*20+12+20=272. The architected cross-connections result in a combinatorial multiplication of the number of possible functions which can be encoded as architected commands.

An issue which arises with this architecture is that encoding 272 separate dual-MAC operations within a command code requires 9 bits. It is advantageous to reduce the number of bits required to encode dual-MAC instructions without impacting available functionality. This is especially true when the number of bits available to encode commands is limited and other commands must also be encoded within the same limited number of bits. In the specific dual-MAC processor at issue, only 7 bits have been dedicated to encoding commands for dual-MAC operations.

According to the present invention, a near-orthogonal dual-MAC instruction set is provided which implements virtually the entire functionality of the orthogonal instruction set of 272 commands using only 65 commands. The reduced instruction set is achieved by eliminating instructions based on symmetry with respect to the result of the commands and by imposing simple restrictions related to items such as the order of data presentation by the programmer. Specific selections of commands are also determined by the double word aligned memory architecture which is associated with the dual-MAC architecture. The reduced instruction set architecture preserves the functionality and inherent parallelism of the command set and requires fewer command bits to implement than the full orthogonal set.

BRIEF DESCRIPTION OF THE DRAWINGS

The foregoing and other features of the present invention will be more readily apparent from the following detailed description and drawings of illustrative embodiments of the invention in which:

FIG. 2 is a table showing an orthogonal command set for the dual-MAC processor of FIG. 1.

FIG. 3 is a table showing a near-orthogonal command set according to the present invention for the dual-MAC processor of FIG. 1.

DETAILED DESCRIPTION OF THE PREFERRED EMBODIMENT

Figure 1:
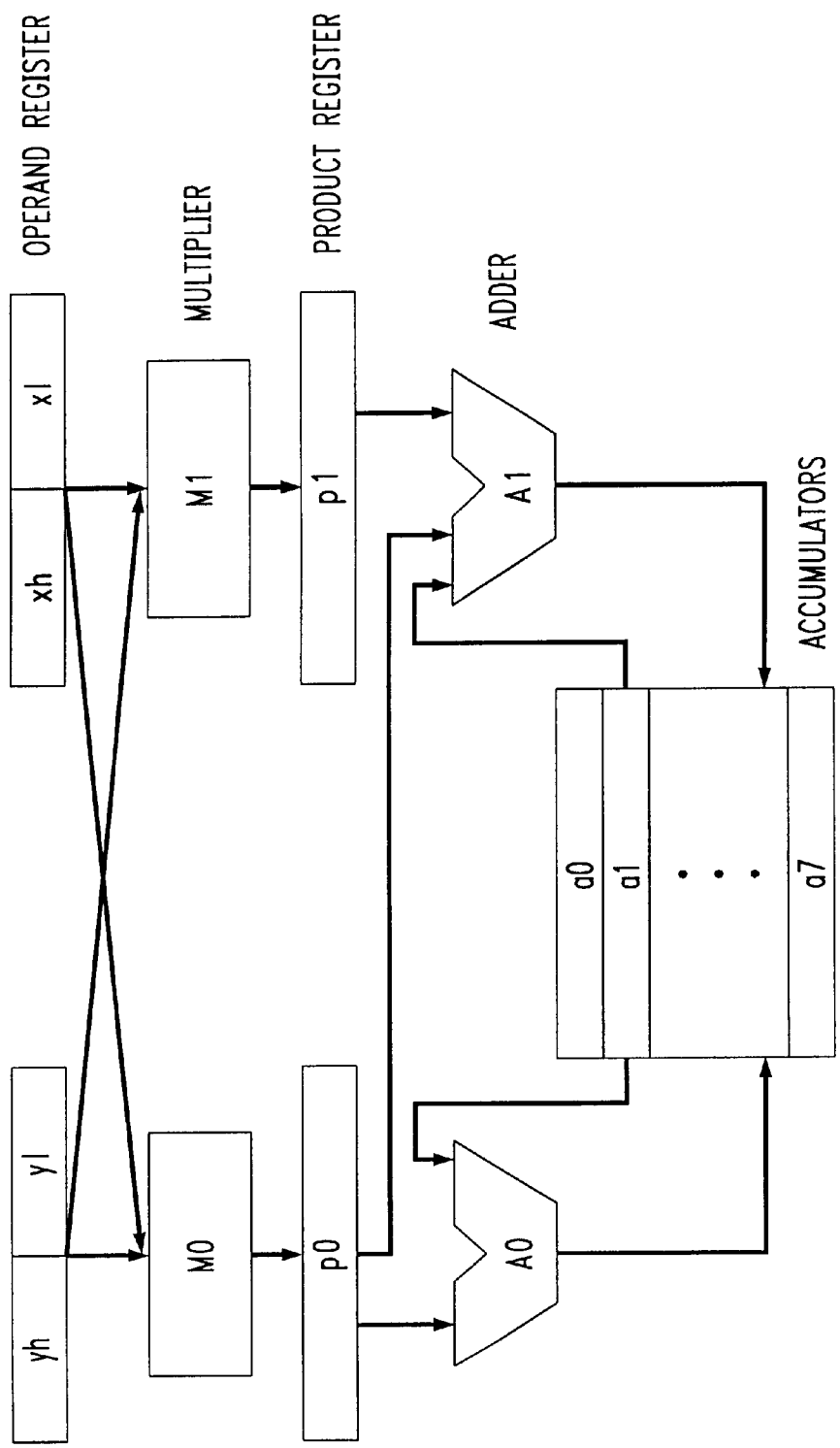
FIG. 1 is a simplified block diagram of a dual-MAC processor.

As shown in FIG. 2, there are 12 possible accumulate statements and 20 possible product statements for the dual-MAC processor shown in FIG. 1, which can be architected separately or in combination. The reduction of the orthogonal instruction set to provide a near-orthogonal reduced instruction set is discussed with respect to each function type.

There are four possible single two-input accumulate statements:

$aD=aS+p0$ $aD=aS-p0$ $aD=aS+p1$ $aD=aS-p1$ where aD and aS are any of the 8 accumulators for the dual-MAC processor of FIG. 1. It should be noted that, in addition to encoding the dual-MAC command itself, the identity of the D and S accumulators to which the command is directed also must be stored within the command op code. When one of these commands is executed, only one of the two MAC paths will be engaged. The other will be idle. Because the result of the accumulate statement is stored in an accumulator which is equally accessible to both MAC paths, there is no need to encode commands for both paths. By default, the p0 path is chosen. The reduced command set is therefore: aD=aS+/−p0.

There are four possible 3-input accumulate statements:

$aD=aS+p0+p1$ $aD=aS+p0-p1$ $aD=aS-p0+p1$ $aD=aS-p0-p1$

Theoretically, a reduction of these commands could be made by recognizing that p0 and p1 may be "swapped" if the programmer adjusts the order of the inputs to the multiplier accordingly. However, this strategy cannot be used to reduce both the accumulate instruction set and the product instruction set, discussed below, because the accumulate and product commands must be capable of being encoded as accumulate/product pairs. Thus, only one of the two commands in the pair can be reduced in this manner. The input-swap strategy provides the greatest reduction for the product statements, discussed below, and therefore all four of the 3-input accumulate statements are implemented.

There are four possible dual two-input accumulate statements, each consisting of two two-input accumulate statements which are executed in parallel:

| | |
|---|---|
| aD0 = aS0 + p0 | aD1 = aS1 + p1 |
| aD0 = aS0 + p0 | aD1 = aS1 − p1 |
| aD0 = aS0 − p0 | aD1 = aS1 + p1 |
| aD0 = aS0 − p0 | aD1 = aS1 − p1 | where aD0, aD1, aS0, and aS1 each refer to one of the 8 accumulators. The number of commands in this set is not reduced for the same reasons discussed with respect to the three-input accumulate statements, above. However, a reduction in encoding bits elsewhere in the command op code may be achieved by limiting the accumulators that can be selected in the command to adjacent accumulator pairs. In the preferred embodiment, aD0 is limited to even accumulator addresses and aD1 is defined as the accumulator aD0+1. The consecutive pairs of accumulators are designated aD and aDP. Similarly, accumulator pairs aS0 and aS1 are limited to aS and aSP. This reduction provides a modified command set of:

| | |
|---|---|
| aD = aS + p0 | aDP = aSP + p1 |
| aD = aS + p0 | aDP = aSP − p1 |
| aD = aS − p0 | aDP = aSP + p1 |
| aD = aS − p0 | aDP = aSP − p1 |

Although four commands must still be encoded, only one accumulator of the pair needs to be specified since the commands are limited to adjacent accumulator pairs. Because there are eight accumulators, three bits are required to identify an accumulator. By limiting the accumulators to adjacent pairs so that only two accumulators need to be identified, as opposed to four, and selecting the even accumulator of the pair to define, the total number of bits needed to identify the accumulators in the op code is reduced from 12 to 4.

There are four possible factors which can be presented to the multipliers. These factors are stored in two divided registers. The x-register holds the xh and xl factors and the y-register holds the yh and yl factors. Because of the cross-connected architecture, any two of the four factors may be input to each multiplier M0, M1.

There are eight possible single-products statements:

$p0=xh*yh$ $p0=xh*yl$ $p0=xl*yh$ $p0=xl*yl$ $p1=xh*yh$ $p1=xh*yl$ $p1=xl*yh$ $p1=xl*yl$ where p0 and p1 are the products output from multipliers M0 and M1 respectively. As with the single two-input accumulate statements, discussed above, only one of the two MAC paths will be engaged when one of these commands is executed. Thus, as above, the commands can be limited to only the p0 side. Further, the position of the factors within the x and y registers is under the control of the programmer. The set may be further reduced by restricting the operation to only two factor positions, arbitrarily chosen to be xh and yh. The reduced command set is therefore only the single command: p0=xh*yh.

There are twelve possible dual product statements:

| 1. p0 = xh * yh | p1 = xh * yl |
| 2. p0 = xh * yh | p1 = xl * yh |
| 3. p0 = xh * yh | p1 = xl * yl |
| 4. p0 = xh * yl | p1 = xh * yh |
| 5. p0 = xh * yl | p1 = xl * yh |
| 6. p0 = xh * yl | p1 = xl * yl |
| 7. p0 = xl * yh | p1 = xh * yh |
| 8. p0 = xl * yh | p1 = xh * yl |
| 9. p0 = xl * yh | p1 = xl * yl |
| 10. p0 = xl * yl | p1 = xh * yh |
| 11. p0 = xl * yl | p1 = xh * yl |
| 12. p0 = xl * yl | p1 = xl * yh |

Several of these commands result in identical multiplications being performed, differing only in which MAC processor is used and thus which product register the result appears in. The symmetric pairs are 1–4, 2–7, 3–10, 5–8, 6–11, and 9–12. Thus, a first reduction can take advantage of this symmetry and encode only one command of each symmetric pair. The reduction results in the 6 commands shown below:

| 1. p0 = xh * yh | p1 = xh * yl |
| 2. p0 = xh * yh | p1 = xl * yh |
| 3. p0 = xh * yh | p1 = xl * yl |
| 5. p0 = xh * yl | p1 = xl * yh |
| 6. p0 = xh * yl | p1 = xl * yl |
| 9. p0 = xl * yh | p1 = xl * yl |

The set can be further reduced by recognizing that "nearly-symmetric" pairs can be eliminated by relying on the ability of the programmer to direct data into the x- or y-register as desired. For items 1 and 2, note that the p0 operations are identical. The p1 operations differ only in which register the high-word factor and low-word factor are chosen from. Switching the x- and y-register data in command 2 gives the same result as command 1. Thus, only one of the two commands needs to be implemented. No functionality is lost because the programmer can simply switch the order of the inputs. Items 6 and 9 are also nearly symmetric.

It should be noted that in the preferred embodiment, the dual-MAC processor is implemented with an aligned double word memory architecture. As a result, this near-symmetry is not available with respect to items 3 and 5. Although in theory, the programmer has absolute control over where the factor data is stored in the registers and thus how it is presented to the dual-MAC processor, the aligned double word memory architecture of the preferred embodiment provides for two data values to be fetched in a single double word operation and stored in the x- or y-register. Switching which register the two data values are stored in does not carry with it a performance penalty. However, dividing the data requires extra commands and therefore carries a performance penalty. To avoid this situation, both commands 3 and 5 are implemented. The final reduced dual product command set is:

| p0 = xh * yh | p1 = xh * yl |
| p0 = xh * yh | p1 = xl * yl |
| p0 = xh * yl | p1 = xl * yh |
| p0 = xl * yh | p1 = xl * yl |

The complete reduced command set is illustrated in FIG. 3. There are 10 different accumulate statements and 5 different product statements, resulting in a total number of architected commands equal to 10*5+10+5=65. Encoding these operations with 7 bits of the op code allows for an additional 63 commands to be implemented without increasing the number of required bits.

We claim:

1. A microprocessor including two MAC processors, an input of each MAC processor being cross-connected to the input of the other MAC processor, each MAC processor having a multiplier connected to an adder, said adders being connected to an accumulator having a plurality of registers, an output of the multiplier of one MAC processor being cross-connected to the input of the adder of the other MAC processor, said microprocessor having a reduced set of architected instructions in which the architected instructions for controlling said multipliers and adders are comprised of:

only two single two-input accumulate statements associated with a particular one of said two MAC processors;

only four dual two-input accumulate statements, each of said dual two-input accumulate statements being restricted to acting on predefined pairs of accumulator registers;

only four three-input accumulate statements;

only one single-product statement; and only four dual-product statements, no two of which form a symmetric pair.

2. The microprocessor of claim 1, wherein:

said accumulator comprises eight accumulator registers;

said predefined pairs of registers comprise four pairs of numerically adjacent registers; and two bits are reserved in said dual two-input accumulate statements to identify a accumulator pair.

3. The instruction set of claim 1, wherein:

said accumulator comprises eight accumulator registers;

said predefined pairs of registers comprise four pairs of numerically adjacent registers; and two bits are reserved in said dual two-input accumulate statements to identify a accumulator pair.

4. A microprocessor connected to a memory system supporting aligned-double word fetches of data, said microprocessor including:

four operand registers xh, xl, yh, and yl;

first and second two-input multipliers having output product registers p0 and p1, said four operand registers being selectively connected as inputs for said first and second two-input multipliers;

a first adder receiving as an input the value in p0;

an accumulator array of registers with a value of a register selected from said accumulator array being another input to said first adder, said first adder providing an output to the accumulator array;

a second adder receiving as an input the value in p0, the value in p1, and a data value selected from a register in the accumulator array and providing an output to the accumulator array; and the microprocessor having a reduced set of architected instructions in which the architected instructions for controlling said multipliers and adders are comprised of:

only two two-input accumulate statements of the form $$aD=aS +/-p0,$$

where aD and aS indicate destination and source accumulator registers, respectively;

only four three-input accumulate statement of the form $$aD=aS +/-p0 +/-p1;$$

only four dual two-input accumulate statements of the form

| aD = aS +/− p0 | aDP = aSP +/− p1, |
|---|---| where aDP and aSP indicate destination and source accumulator registers, respectively, the destination registers aD and aDP and the source registers aS and aSP each indicating a predefined pair of accumulator registers;

only one single product statement of the form p0 xh*yh; and only four dual product statements of the form:

| p0 = xh * yh | p1 = xh * yl; |
|---|---|
| p0 = xh * yh | p1 = xl * yl; |
| p0 = xh * yl | p1 = xl * yh; |
| p0 = xl * yh | p1 = xl * yl. |

5. A microprocessor including two MAC processors, an input of each MAC processor being cross-connected to the input of the other MAC processor, each MAC processor having a multiplier connected to an adder, said adders being connected to an accumulator having a plurality of registers, an output of the multiplier of one MAC processor being cross-connected to the input of the adder of the other MAC processor, said microprocessor having a reduced set of architected instructions in which the architected instructions for controlling said multipliers and adders are comprised of:

only two two-input accumulate statements of the form:

$$aD=aS +/-p0,$$

where aD and aS indicate destination and source accumulator registers, respectively;

only four three-input accumulate statements of the form:

$$aD=aS +/ -p0 +/-p1;$$

only four dual two-input accumulate statements of the form:

| p0 = xh * yh | p1 = xh * yl |
|---|---|
| p0 = xh * yh | p1 = xl * yl |
| p0 = xh * yl | p1 = xl * yh |
| p0 = xl * yh | p1 = xl * yl. | where aDP and aSP indicate destination and source accumulator registers, respectively, the destination registers aD and aDP and the source registers aS and aSP each indicating a predefined pair of accumulator registers;

only one single product statement of the form p=xh*yh; and only four dual product statements of the form:

6. A microprocessor supporting aligned-double word fetches of data, said microprocessor including:

four operand registers xh, xl, yh, and yl;

first and second two-input multipliers having output product registers p0 and p1, said four operand registers being selectively connected as inputs for said first and second two-input multipliers;

a first adder receiving as an input the value in p0;

an accumulator array of registers with a value of a register selected from said accumulator array being another input to said first adder, said first adder providing an output to the accumulator array;

a second adder receiving as an input the value in p0, the value in p1, and a data value selected from a register in the accumulator array and providing an output to the accumulator array; and the microprocessor having a reduced set of architected instructions in which the architected instructions for controlling said multipliers and adders are comprised of:

only two single two-input accumulate statements;

only four three-input accumulate statements;

only four dual two-input accumulate statements, each of said dual two-input accumulate statements being restricted to acting on predefined pairs of accumulators registers;

only one single product statement; and only four dual product statements, no two of which form a symmetric pair.

7. A microprocessor having two cross-connected MAC processors, comprising:

a first MAC processor having at least one operand register, a multiplier, the output of the operand register connected to at least one input of the multiplier, and a product register, the output of the multiplier connected to the input of the product register; and a second MAC processor having a multiplier and an adder, wherein at least one input of the multiplier receives the output of the operand register of the first MAC processor, and further wherein an output of the product register of the first MAC processor is connected to an input of the adder of the second MAC processor.

8. A microprocessor as in claim 7, wherein the second MAC processor further comprises an operand register, the output of the operand register connected to at least one input of the multiplier of the first MAC processor.

9. A microprocessor as in claim 7, wherein the second MAC processor further comprises, a product register and an accumulator, the input of the product register connected to the output of the multiplier, the output of the product register connected to at least one input of the adder, the output of the accumulator connected to at least one input of the adder, and the output of the first MAC processor product register selectively connected to the input of the adder.

10. A microprocessor as in claim 8, wherein the second MAC processor further comprises, a product register and an accumulator, the input of the product register connected to the output of the multiplier, the output of the product register connected to at least one input of the adder, the output of the accumulator connected to at least one input of the adder, and the output of the first MAC processor product register selectively connected to the input of the adder.

11. A microprocessor as in claim 10, wherein the first MAC processor further comprises an adder and an accumulator, the output of the product register connected to the input of the adder, the output of the accumulator connected to the input of the adder, and the output of the adder connected to the accumulator.

12. A microprocessor including two MAC processors, an input of each MAC processor being cross-connected to the input of the other MAC processor, each MAC processor having a multiplier connected to an adder, said adders being connected to an accumulator having a plurality of registers, an output of the multiplier of one MAC processor being cross-connected to the input of the adder of the other MAC processor, said microprocessor having a reduced set of architected instructions in which the architected instructions for controlling said multipliers and adders are comprised of:

only two single two-input accumulate statements associated with a particular one of said two MAC processors.

13. A microprocessor including two MAC processors, an input of each MAC processor being cross-connected to the input of the other MAC processor, each MAC processor having a multiplier connected to an adder, said adders being connected to an accumulator having a plurality of registers, an output of the multiplier of one MAC processor being cross-connected to the input of the adder of the other MAC processor, said microprocessor having a reduced set of architected instructions in which the architected instructions for controlling said multipliers and adders are comprised of:

only one single-product statement.

14. A microprocessor including two MAC processors, an input of each MAC processor being cross-connected to the input of the other MAC processor, each MAC processor having a multiplier connected to an adder, said adders being connected to an accumulator having a plurality of registers, an output of the multiplier of one MAC processor being cross-connected to the input of the adder of the other MAC processor, said microprocessor having a reduced set of architected instructions in which the architected instructions for controlling said multipliers and adders are comprised of:

only four dual-product statements, no two of which form a symmetric pair.

* * * * *